United States Patent
Silsby et al.

(10) Patent No.: US 7,471,315 B2
(45) Date of Patent: Dec. 30, 2008

(54) APPARATUS AND METHOD FOR DETECTING AND COMPENSATING FOR ILLUMINANT INTENSITY CHANGES WITHIN AN IMAGE

(75) Inventors: Christopher Silsby, Abany, OR (US); Dwight Poplin, Corvallis, OR (US); Richard L. Baer, Los Altos, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 1107 days.

(21) Appl. No.: 10/388,813

(22) Filed: Mar. 14, 2003

(65) Prior Publication Data

US 2004/0179114 A1 Sep. 16, 2004

(51) Int. Cl.
*H04N 9/73* (2006.01)
(52) U.S. Cl. .................................. 348/226.1
(58) Field of Classification Search ............. 348/226.1, 348/241, 370
See application file for complete search history.

(56) References Cited

U.S. PATENT DOCUMENTS

| | | | |
|---|---|---|---|
| 3,633,017 A | 1/1972 | Crooke et al. | |
| 5,701,526 A * | 12/1997 | Iwasaki | 396/234 |
| 5,793,886 A | 8/1998 | Cok | |
| 5,960,153 A | 9/1999 | Oster et al. | |
| 6,208,433 B1 | 3/2001 | Iwakawa et al. | |
| 6,271,884 B1 | 8/2001 | Chung et al. | |
| 6,295,085 B1 * | 9/2001 | Munson et al. | 348/226.1 |
| 6,630,953 B1 * | 10/2003 | Toyoda et al. | 348/226.1 |
| 6,900,834 B2 * | 5/2005 | Henderson et al. | 348/226.1 |
| 2002/0158971 A1 * | 10/2002 | Daiku et al. | 348/226.1 |

* cited by examiner

*Primary Examiner*—Tuan V. Ho
(74) *Attorney, Agent, or Firm*—Ratner Prestia

(57) ABSTRACT

An apparatus such as a digital camera includes an image sensor array adapted to capture a scene into electrical values and a reference detector proximal to the sensor array for detecting illuminant intensities. The reference detector at least partially surrounds the image sensor array. The reference detector is read multiple times during the frame period in which the image sensor array captures a scene to detect illuminant intensities during the same frame period. Using the illuminant intensities, the phase and the amplitude of the flicker of the illuminant are extracted. Using the phase and the amplitude parameters, a flicker correction signal is synthesized. The flicker correction signal is used to correct the captured image data to reduce or eliminate adverse effects of flicker on the captured image.

24 Claims, 6 Drawing Sheets

US 7,471,315 B2

APPARATUS AND METHOD FOR DETECTING AND COMPENSATING FOR ILLUMINANT INTENSITY CHANGES WITHIN AN IMAGE

BACKGROUND

The present invention relates to digital imaging systems. More particularly, the present invention relates to the technique of detecting and compensating for illuminant intensity changes in digital imaging systems.

In digital cameras, a scene is captured by using a lens to form an image of the scene on the surface of an array of sensors, such as photodiodes. Each sensor detects light from a tiny portion of the scene. At each sensor, the detected light is converted into an electrical signal, and then into a digital value indicating the intensity of the light detected by that sensor. Then, the digital values from all of the sensors of the array are combined to form an image.

Popular sensor arrays include CMOS (complementary metal-oxide semiconductor) sensors and CCDs (charge-coupled devices). The sensor array often includes a rectangular layout of many hundreds of thousands, millions, or even greater number of sensors, each sensor providing a digital value, or a pixel, of information. For example, a rectangular sensor array arranged in 640 columns and 480 rows has 307,200 sensors, or pixels. A digital value from a sensor is defined as a pixel of the image. For convenience, terms "sensor" and "pixel" are herein used interchangeably unless otherwise noted, and each sensor, or pixel, is referred generically as $P_{i,j}$ where i,j indicates that the pixel is located at $i^{th}$ column at $j^{th}$ row of a rectangular sensor array having M columns and N rows, the value of i ranging from 1 to M, inclusive, and the value of j ranging from 1 to N, inclusive.

To capture the scene, the electrical value of each of the sensors of the array is read serially. That is, the camera reads the digital values of each of the sensors beginning with the first sensor, $P_{1,1}$ and ending with the last sensor, $P_{M,N}$. Typically, the pixels are read row-wise, that is, row by row. To read each sensor, the sensor is first reset to a predetermined value, for example, zero. Then, the value of the sensor is read after an exposure period. The exposure period determines how long the sensor being read has been exposed to the scene. The exposure period is also referred to an integration period. This is because the sensor sums up, or integrates, the light it receives during the exposure period. A rolling shutter technique is often used to read the sensor array. The rolling shutter is implemented by sequentially resetting each row of sensors and sequentially reading the values of each row of sensors. The duration or the period of time between the reset and the read is the integration period. The period of time taken to read the entire array of sensors is often referred to as a frame period or an image capture period.

The scene captured during the frame period is often illuminated by an electrically powered light having flicker. Flicker is the wavering of the characteristics of light source with time, including variations of light intensity, color temperature, or spatial position. Flicker is often too rapid for the human eye to detect. Some common light sources that exhibit flicker are fluorescent lights often used in office and industrial settings and tungsten halogen incandescent lamps. For example, in fluorescent lamps, the phosphors in the lamp are excited at each peak in the waveform of the AC (alternating current) power source. Between the peaks of the AC power, the light intensity is diminished. The light pulses that are produced have a flicker frequency that is twice that of the AC source. In the United States of America, the commonly available AC power has a sinusoidal waveform of approximately 60 Hz producing light having 120 Hz flicker frequency. That is, a fluorescent lamp produces light that cycles from high intensity to low intensity at approximately every $120^{th}$ of a second. Thus, the flicker period is 8.3 milliseconds (ms). The flicker period can vary from country to country depending on the frequency of the AC power source. The flicker due to the AC power waveform is illustrated in FIG. 1 as illuminant intensity curve 12 of the graph 10.

If the light flickers during the frame period, then undesirable artifacts can appear in the captured image. This is because some portions, or rows, of the sensor array are exposed to the scene and read when the scene is illuminated with relatively high intensity light while other portions, or rows, of the sensor array are exposed to the scene and read when the scene is illuminated with relatively low intensity light. Such undesirable artifacts can include, for example, variations in brightness and horizontal bands within a captured image.

A common frame rate of various sensor arrays is 30 frames per second. That is, typically, it takes about 33.3 ms to capture a scene. The frame period is also illustrated in FIG. 1 as beginning at time $T_0$ and ending at time $T_8$. A frame period can include one or more flicker periods producing visible artifacts in the captured image. As illustrated, within the frame period, four flicker periods occur, each flicker period having a period of time of relative low intensity of the light from the illuminant.

FIG. 2 illustrates a sensor array 20 in a rectangular grid having M columns and N rows of pixels. For example, M can be 640 and N can be 480. The first pixel is illustrated as $P_{1,1}$, a generic pixel at Column i and Row j as $P_{i,j}$, and the last pixel at Column M and Row N as $P_{M,N}$. To avoid clutter, not all rows or columns are illustrated; however, the presence of the columns and the rows not illustrated are indicated by ellipses 22. FIG. 2 also illustrates the graph 10 including the illuminant intensity curve 12, rotated.

To capture a scene lighted by an illuminant, the sensor array 20 is read beginning at time $T_0$, row-wise, and ending at time $T_8$. On one hand, at times $T_0$, $T_2$, $T_4$, $T_6$, and $T_8$, light from the illuminant is at its highest intensity. On the other hand, at times $T_1$, $T_3$, $T_5$, and $T_7$, light from the illuminant is at its lowest intensity. Accordingly, rows of sensors detecting light at or near these times ($T_1$, $T_3$, $T_5$, and $T_7$) receive relatively less light than the rows of sensors detecting light during the other time periods ($T_0$, $T_2$, $T_4$, $T_6$, and $T_8$). For convenience, the rows of sensors detecting light at or near the times $T_1$, $T_3$, $T_5$, and $T_7$ are referred herein as ROW($T_1$), ROW($T_3$), ROW($T_5$), and ROW ($T_7$), respectively. This results in a final image having dark bands at these rows.

To alleviate this problem various methods have been suggested. For example, one approach that is suggested involves the use of histograms of light levels of different image frames. The histograms are compared so that the variation in the mean level of illumination as a function of time can be removed. This approach is not applicable where only a single image frame is available. In another approach, the integration period is restricted to integer multiples of the flicker period. This places an undesirable lower limit on the integration period and introduces possible overexposure issues for brightly illuminated scenes. Other approaches include use of mirrors, prisms, and other bulky and expensive components to marginally alleviate the artifacts problem with varying degree of success.

There remains a need for an improved digital imaging system that detects illuminant intensity changes within an image capture period and compensates the captured digital image from effects of the illuminant intensity changes.

SUMMARY

The need is met by the present invention. In a first embodiment of the present invention, an input apparatus includes an image sensor array adapted to capture a scene into electrical values and a reference detector proximal to the sensor array for detecting illuminant intensities.

In a second embodiment of the present invention, a method of detecting illuminant intensity changes is disclosed. First, a reference detector is reset. Then, a set of sensors of an image sensor array is read. Next, the reference detector is read. These steps are repeated for each set of sensors of the image sensor array.

In a third embodiment of the present invention, a digital camera includes an image sensor array adapted to capture a scene into electrical values within an image capture period and a reference detector proximal to the sensor array adapted to detect illuminant intensities within the image capture period. A processor connected to the image sensor array is adapted to process the electrical values and memory connected to the processor is adapted to store the electrical values.

In a fourth embodiment of the present invention, a method of processing a digital image is disclosed. First, illuminant intensities are detected during a frame period of the digital image, the illuminant intensities converted to digital values, the illuminant intensities having flicker at a flicker frequency. Then, flicker correction parameters are extracted from the illuminant intensities. Next, flicker correction signal is synthesized. Finally, the flicker correction signal is applied to the digital image.

In a fifth embodiment of the present invention, an apparatus includes an image sensor array adapted to capture a scene into electrical values within an image capture period and reference detector adapted to detect illuminant intensities within the image capture period. A processor is connected to the image sensor array is adapted to process the electrical values. Memory is connected to the processor and is adapted to store the electrical values.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
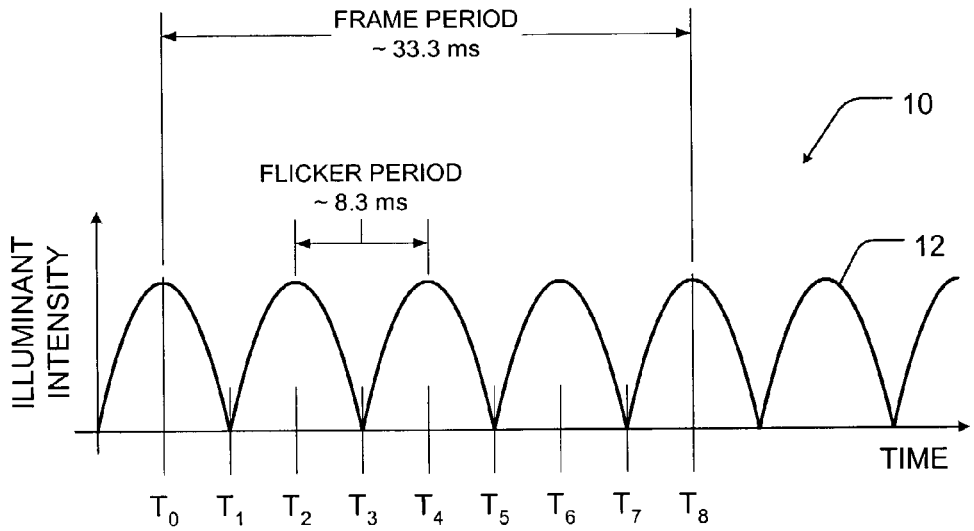
FIG. 1 illustrates a graph including flicker characteristics of an illuminant intensity curve.
Figure 3:
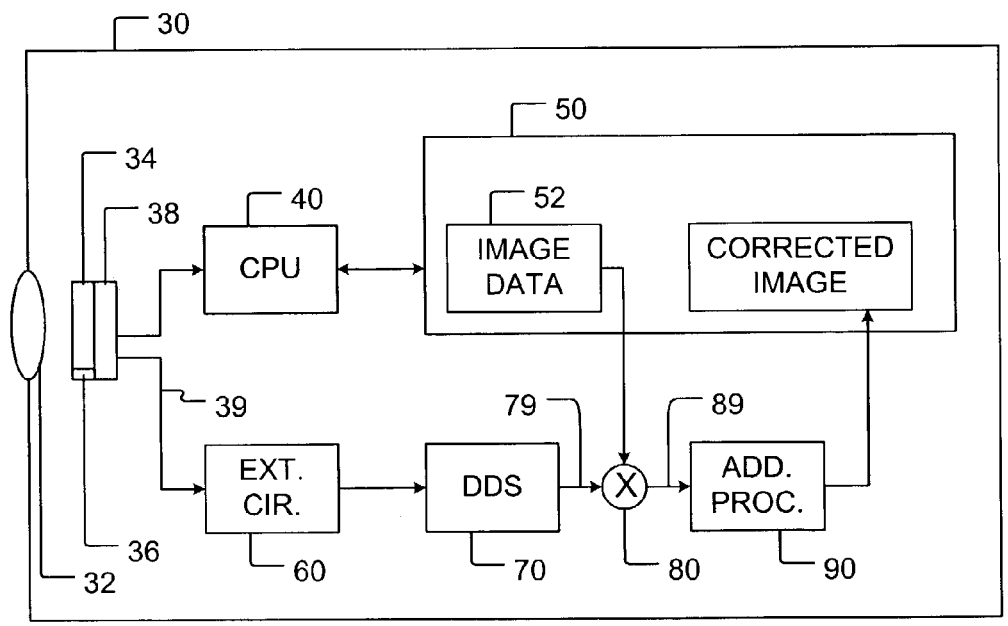
FIG. 3 illustrates an apparatus according to one embodiment of the present invention.

FIG. 3 illustrates an apparatus 30 according to one embodiment of the present invention. The apparatus 30 can be, for example, a digital camera, camcorder, or a mobile communication device. Typically, the apparatus 30 has a lens 32 for focusing light from a scene (not shown) onto an imaging sensor array 34 for capture and conversion into electrical signals. The light from the scene may have originated from an illuminant (not shown) having flicker at a flicker frequency as discussed above and reflected from the scene for capture by the imaging sensor array 34. The light from the scene is also detected by a reference detector 36 situated proximal to the imaging sensor array 34 for detecting illuminant intensities.

Figure 2:
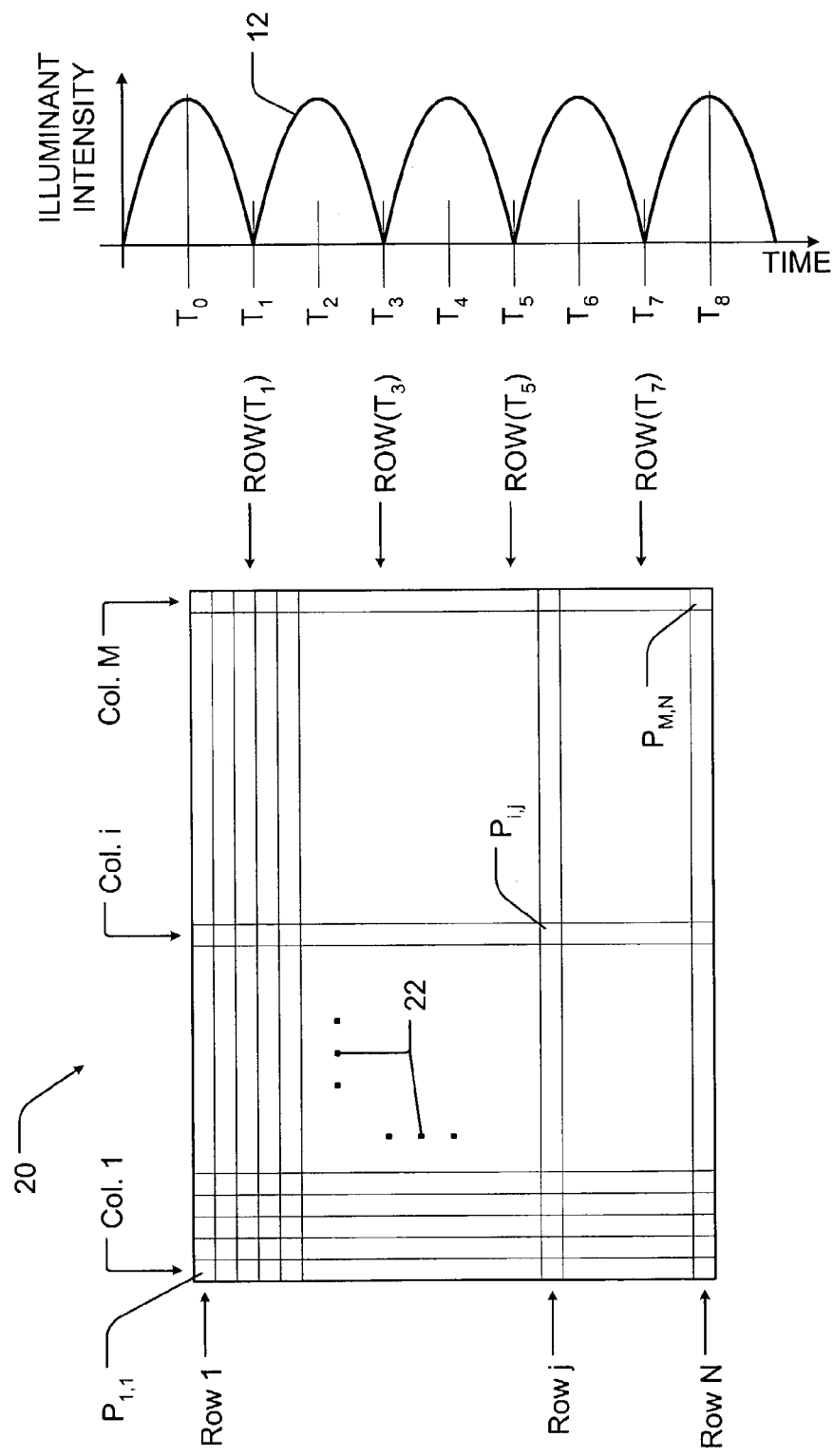
FIG. 2 illustrates a sensor array in relationship to the graph of FIG. 1.
Figure 5:
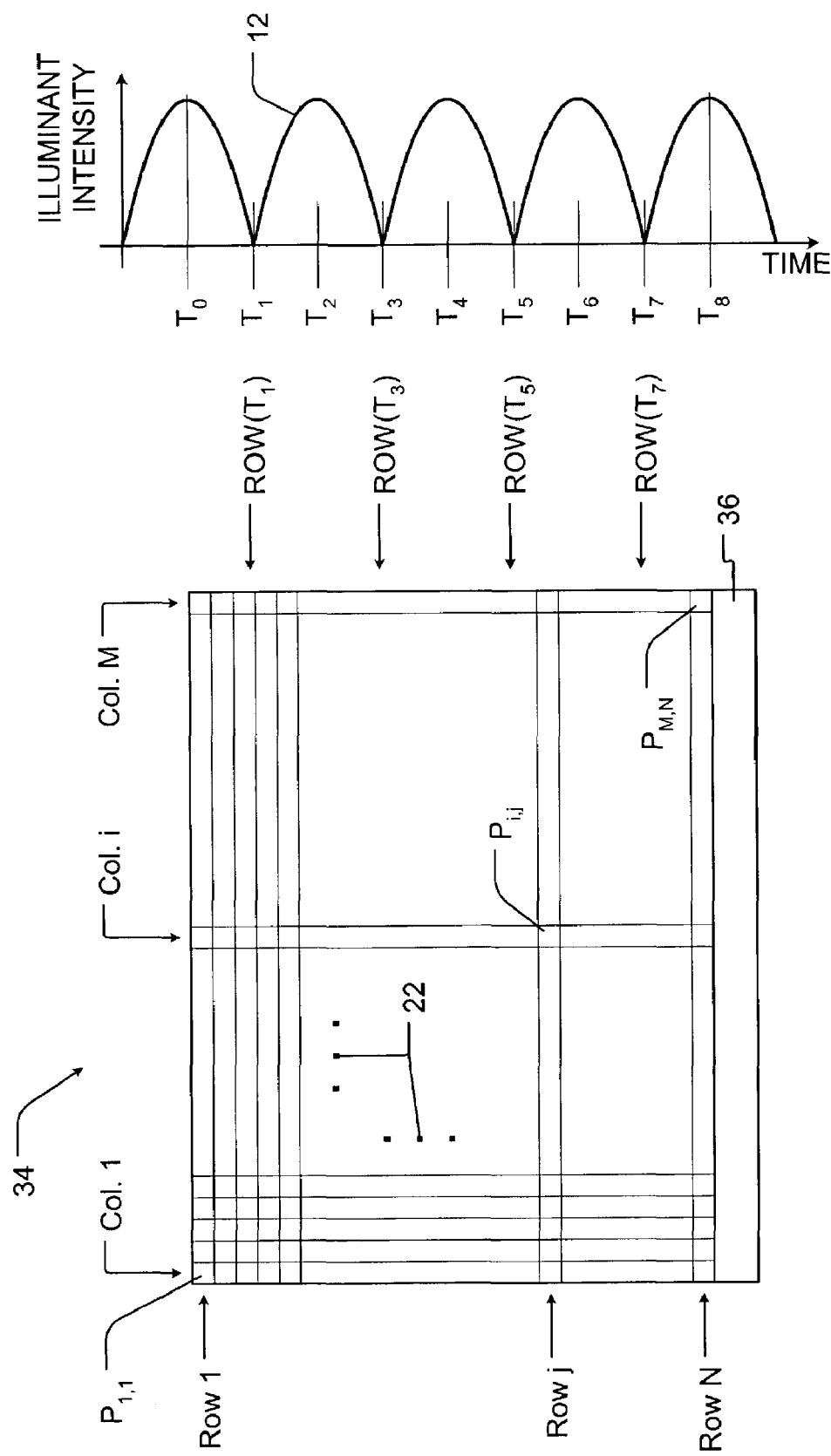
FIGS. 5, 6, 7A and 7B are more detailed illustrations of various portions of the apparatus of FIG. 3.

The sensor array 34 is typically an array of photo-detectors that receive focused light and converts the light into captured electrical signals that, ultimately, are converted to digital electronic signals representing digital values. The digital values represent the scene captured by the apparatus 30. The sensor array 34 can be fabricated on a substrate that can also include an analog-to-digital converter 38 (ADC) to convert the captured electrical signals to digital electronic values. A processor 40, connected to the sensor array 34, receives the digital values and can store the digital values in storage 50 as captured image data 52. The sensor array 34 can be, for example, a CMOS (complementary metal-oxide semiconductor) photo-detector array. Front view of the sensor array 34 and the reference detector 36 is illustrated in FIG. 5, the sensor array 34 including the rows and columns of pixels similar to the sensor array 20 of FIG. 2. For convenience, the pixels, the rows, and the columns of the sensor array 34 are referred to using the same notations as the pixels, the rows, and the columns of the sensor array 20 as illustrated in FIG. 2. As for the processor 40, various implementations are known in the art. For example, the processor 40 can be a proprietary limited instruction set CPU, or an off-the-shelf component such as an ARM946E-S. Moreover, for the storage 50, both temporary and permanent storage elements can be used, for example, RAM (random access memory), compact flash memory, or magnetic storage.

The Reference Detector

As already discussed, during the frame period in which the scene is captured, the light illuminating the scene can flicker. Such flicker causes undesirable artifacts such as dark bands across the captured image represented by the captured image data 52. The flicker can be detected by detecting illuminant intensities during the frame period of the digital image 52 using the reference detector 36. To detect the flicker affecting the image being captured, the reference detector 36 is preferably placed proximal or adjacent to the sensor array 34, the reference detector 36 has a field of view similar to the field of view of the image sensor array 34, or both.

FIGS. 4A through 4D illustrate front views of alternative embodiments of the reference detector 36. Portions of these alternative embodiments are similar to those shown in FIG. 3. For convenience, portions of FIGS. 4A through 4D that are similar to portions of FIG. 3 are assigned the same reference numerals, analogous but changed portions are assigned the same reference numerals accompanied by a letter "a," "b," "c," or "d," and different portions are assigned different reference numerals.

Figure 4A:
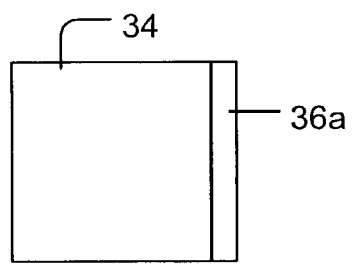
FIGS. 4A-4D illustrate various possible embodiments of a reference detector in relationship to an image array.
Figure 4B:
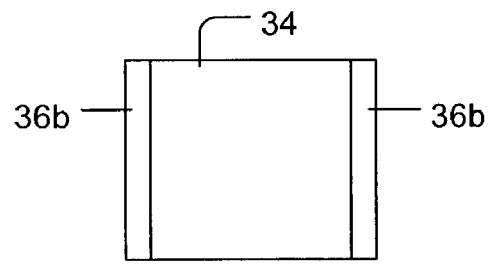
Figure 4C:
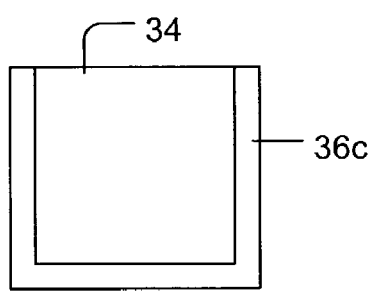
Figure 4D:
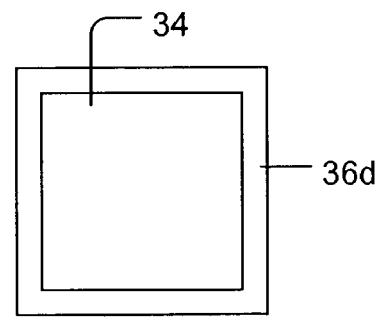

Referring to FIGS. 4A through 4D, various embodiments of the reference detectors—36a, 36b, 36c, and 36d—are illustrated in relationship to the image array 34. In the illustrations, the reference detectors 36a through 36d at least partially surround the image sensor array 34. In FIG. 4B the left and right pieces of the reference detector 36b can be electrically connected to operate as a single reference detector 36b. In FIG. 4D, the reference detector 34d is illustrated surrounding the image sensor array 34. The reference detectors 36a through 36d can be implemented using known photo detector technology, and, can be fabricated along with the image array 34. For convenience, reference numeral 36 is used herein below to generally and generically refer to a reference detector of any configuration.

Another view of the reference detector 110 and the image sensor array 104 is illustrated in FIG. 5, the sensor array having M columns and N rows of sensors, or pixels. Referring to FIG. 5, to detect the flicker, the reference detector 110 can be reset and read at predetermined intervals. For example, to detect flicker, the reference detector 110 is reset before reading a row of pixels. Next, a row of pixels is read. Then, the reference detector 110 read. These steps are repeated for each of row of the sensor array 104. Resetting the reference detector 110 includes setting the reference detector 110 to an initial, default, value or an initial electrical state.

Detecting Illuminant Intensities

The operations of the reference detector to detect illuminant intensity changes can be discussed using FIG. 5. The illuminant intensity during at period of time can be measured by resetting the reference detector 36, exposing the reference detector 36 to the scene for a period of time (integration period for the reference detector 36), and reading the reference detector 36. Accordingly, to detect illuminant intensity or illuminant intensity changes during a frame period in which a scene is captured by the sensor array 34, the reference detector 36 is reset, a set of sensors (for example a row of sensors) of the image sensor array 34 is read (during which the reference detector 36 is exposed to the scene), and the reference detector 36 is read. These steps are repeated for each set (or row) of the sensor array 34.

Depending on how often the reference detector 36 is to be sampled, the set of sensors read during the integration period for the reference detector 36, the set of sensors can include multiples of rows, the multiple factor ranging from less than one to N where N is the number of rows in the image sensor array 34. For example, if the multiple is 0.5, then the reference detector 36 is sampled after each ½ of a row of the image sensor array 34 is read. Of course, the sensors of the imaging sensor array 34 are reset prior to being read also. The integration period for the sensors of the imaging sensor array 34 is further discussed above and is likely to be different than the integration period of the reference detector.

When the reference detector 36 is sampled, the electrical signals are converted into digital electrical values by the ADC converter 38. As illustrated by the illuminant intensity curve 12 of FIG. 5, the illuminant intensities have flicker at a flicker frequency, for example, at 120 Hz as discussed above. The converted output of the reference detector. 36 is designated, for convenience, as the reference detector output 39.

Extracting Flicker Correction Parameters

The flicker waveform produced by a fluorescent or incandescent lamp can be modeled by a simple function, such as the sine-squared function $$F(t)=1.0+(a)\sin^2(wt+p) \quad \text{(Eq. 1)}$$

where t is time;

F(t) is model flicker waveform produced;

a is amplitude;

w is frequency of the AC source driving the lamp; and p is phase.

Similarly, flicker waveform produced by a fluorescent or incandescent lamp can be modeled by the Fourier series $$F(t)=1.0+\Sigma(a_i)\sin(iwt+p_i) \quad \text{(Eq. 2)}$$

where t is time;

F(t) is model flicker waveform produced;

a is amplitude;

i is the harmonic number of the series Practical flicker waveforms can be modeled accurately with only a few harmonics.

w is fundamental frequency of the flicker waveform; and $p_i$ is phase of the model flicker waveform at index i.

The Fourier series model (Eq. 2) is just a generalization of the sine-squared model (Eq. 1). In the Fourier series model, the fundamental frequency is twice the AC power source frequency. Only the zero and first harmonic terms have non-zero values. For other waveforms, the relationship between the higher-order coefficients and the fundamental coefficient can be determined from a priori measurements of different light sources. As an example, if the flicker waveform were a rectified sine wave [F(t)=Abs(Sin(wt))], then the amplitudes of the first few coefficients would be: [0.63 (DC term), 0.21 (fundamental), 0.04 (second harmonic) and 0.02 (third harmonic)]. The only parameters that need be extracted from the reference detector output are amplitude and phase of the fundamental component of the flicker frequency and the mean signal amplitude. These parameters can be extracted readily because they are essentially unvarying for any given light source.

One method to extract the phase and modulation amplitude of the fundamental component of the illuminant intensity including the flicker signal is to perform sine and cosine transforms on the reference detector output 39. The sine and cosine transforms are obtained by integrating the product of the reference detector output with sine and cosine waves at the flicker frequency, over an interval of a number of flicker periods. The sine and cosine waveforms are computed digitally using a priori knowledge of the flicker frequency. For example, if the flicker frequency was 120 Hz, and the frame rate was 30 Hz, The integration would be performed over four flicker periods. If the imaging array contained 480 rows, and the reference signal was measured every row period, there would be 120 flicker samples per flicker period. These samples would be digitally multiplied by 120 pre-computed values of sine and cosine waves of that period. An apodization function can be applied to the integrand to improve the accuracy. Apodization functions force the integrand to become continuous at the ends of the integration interval, reducing the effect of camera motion on the sine and cosine transforms.

Figure 6:
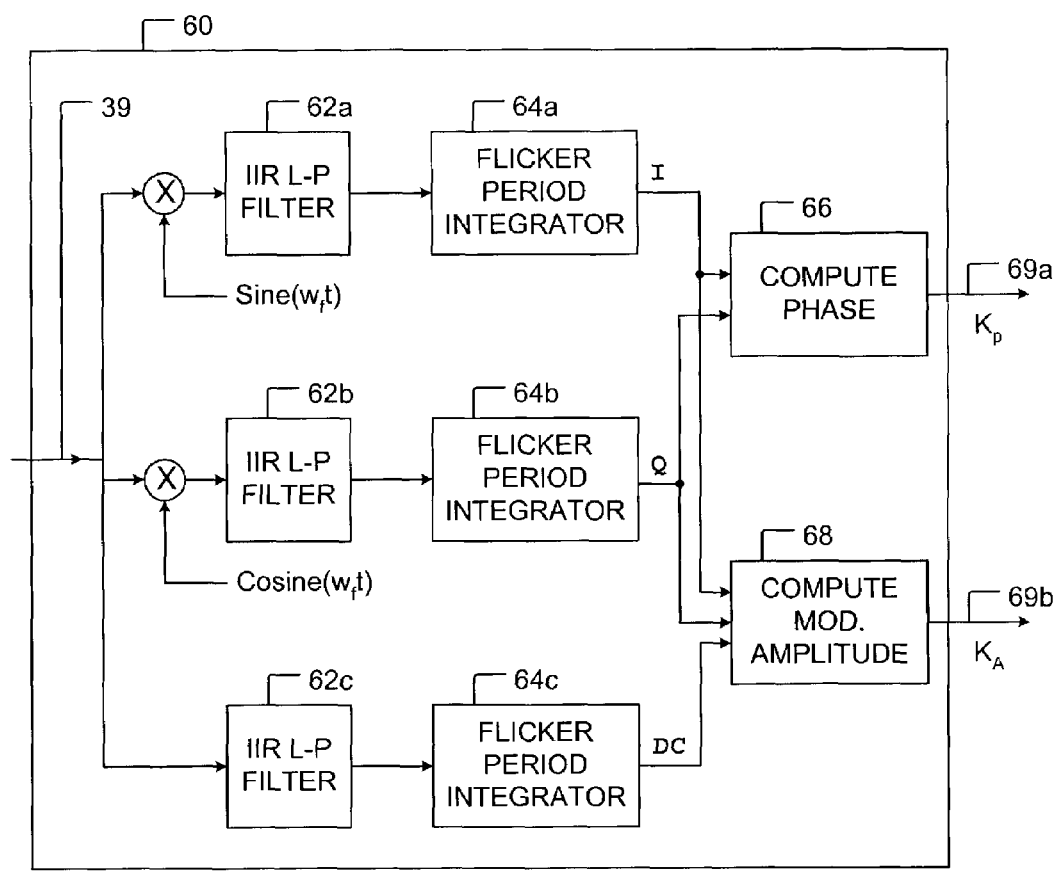

The processor 40 of FIG. 3 can be configured or programmed to perform these functions. Alternatively, an extractor circuit 60 of FIG. 3 including an IQ demodulator and low pass filter can be used. The extractor circuit 60 is illustrated in more detail in FIG. 6. Referring to FIGS. 3 and 6, the reference detector output 39 of the reference detector 36 enters the extractor circuit 60. In the extractor circuit 60, in a first path, the output 39 is digitally multiplied by the digital samples of a sine wave at the flicker frequency and is filtered by a first low-pass filter 62a to obtain an average value of the in-phase (I) channel of the flicker signal that is not strongly effected by changes in scene content. The filtered signal is then integrated over one flicker period by a first flicker period integrator 64a to remove any feed-through at the flicker frequency.

In the extractor circuit 60, in a second path, the output 39 is digitally multiplied by the digital samples of a cosine wave at the flick frequency and is filtered by a second low-pass filter 62b to obtain an average value of the quadrature-phase (Q) channel of the flicker signal that is not strongly effected by changes in scene content. The filtered signal is then integrated over one flicker period by a second flicker period integrator 64b to remove any feed-through at the flicker frequency.

In a third path, the output 39 is filtered by a third low-pass filter 62c and then integrated over one flicker period by a third flicker period integrator 64c resulting in the DC (direct-current) component of the illumination signal. This DC component is needed to generate a correction signal with the correct amplitude relative to the unvarying component of illumination.

A phase computing circuit 66 uses the I-component of the IQ demodulation to compute the phase 69a of the flicker of the illuminant signal as captured by the reference detector 36. The phase is computed as the arctangent of the ratio of the I and the Q channel flicker signals.

An amplitude computing circuit 68 uses the I, the Q, and the DC signals to compute the amplitude 69b of the flicker of the illuminant signal as captured by the reference detector 36. The amplitude is computed as the square root of the sum of the squares of the I and Q channel flicker signals.

The operation of the extraction circuit 60 is simplified when the frame period is an integer multiple of flicker period. Under these circumstances the sine and cosine values can be drawn from a single look up table. Otherwise they must be computed for each sample. The low-pass filters 62a, 62b, and 62c can be IIR (infinite impulse response) filters or FIR (finite impulse response) filters.

Synthesizing a Flicker Correction Signal

Once the flicker phase 69a and modulation amplitude 69b are determined, a flicker correction signal can be synthesized. If the flicker waveform is replicated directly, then it must be divided from the image array data on a row-by-row basis. Alternatively the inverse of the flicker waveform can be synthesized. In this case it can multiply the image array data. The flicker contribution to the image array pixels will depend on the exposure period. If the exposure period is different from the reference pixel exposure period, the correction signal must be adjusted. The waveform used for correction is preferably the convolution of the flicker waveform with a rectangle of width equal to the exposure period used to capture the original image. With the simple flicker models, the integral can be performed analytically. The exposure period adjustment can be built into the circuit that synthesizes the correction signal.

Figure 7A:
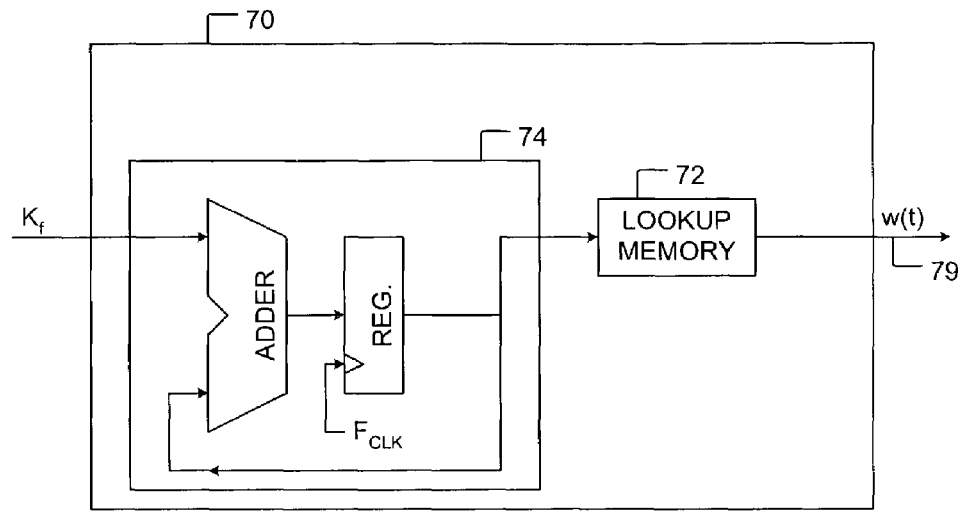

FIG. 7A illustrates one embodiment of the correction signal synthesis circuit 70 of FIG. 3. Referring to FIGS. 3 and 7A, the correction signal synthesis circuit 70 can be a direct digital synthesizer (DDS) also known as a Numerically Controller Modulation Oscillator. Such circuits are known in the art and one example of it is disclosed, for example, in U.S. Pat. No. 3,633,017 issued to Crooke and Hanna. In the correction signal synthesis circuit 70 is illustrated as a DDS 70 including a lookup memory 72 stores consecutive samples over an interval 0 to 360 degrees of a waveform. The lookup memory 72 is driven by a digital accumulator 74 referred to as the phase accumulator 74.

The phase accumulator 74 accumulates the phase of the signal being generated. Such circuit is known in the art to generate a synthesized waveform w(t) 79. The frequency of the synthesized waveform w(t) 79 is determined by the input to the phase accumulator 70. The frequency in Hertz, F, is given by $$F = K_f / 2^N * F_{CLX}$$

where

F is the desired output frequency in Hertz which can be, for example 50 Hz in Europe and 60 Hz in the United States of America;

$K_f$ is the constant value to produce the desired output frequency from the DDS 70;

N is the number of bits (width of the register) of the accumulator 74, for example 16 bits; and $F_{CLK}$ is the frequency of the clock signal applied to the phase accumulator 74.

Figure 7B:
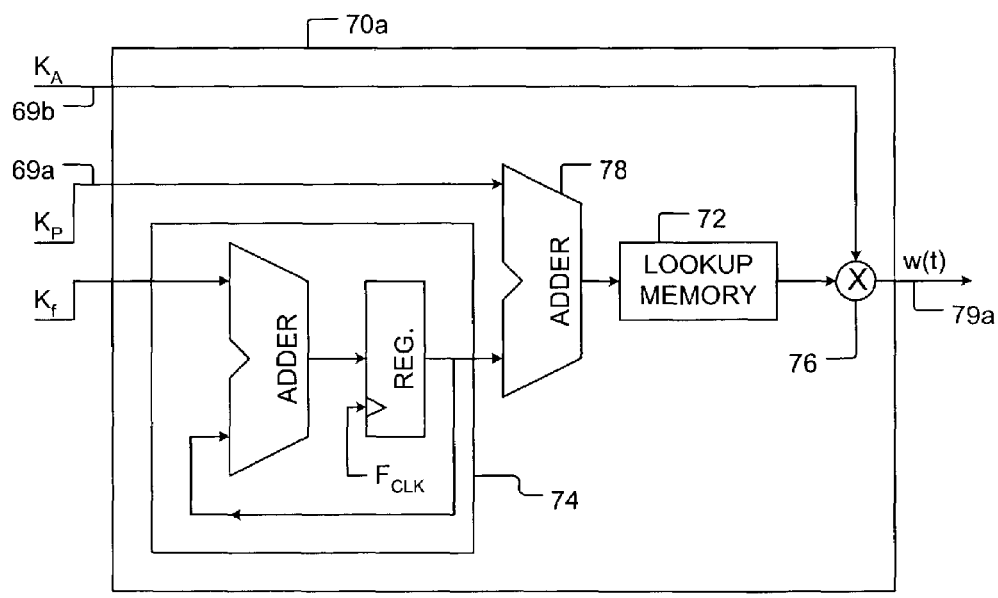

An alternate embodiment of the correction signal synthesis circuit 70 of FIGS. 3 and 7A having certain alternative configuration is illustrated in FIG. 7B. Portions of FIG. 7B are similar to those shown in FIG. 7A. For convenience, portions in FIG. 7B that are similar to portions in FIG. 7A are assigned the same reference numerals, analogous but changed components are assigned the same reference numerals accompanied by letter "a," and different portions are assigned different reference numerals. The exceptions to this nomenclature are reference numbers 69a and 69b which are used in FIGS. 6 and 7B. The alternative embodiment of the correction signal synthesis circuit 70a is an enhanced DDS that includes a multiplier 76 before at the output of the lookup memory 72 which allows convenient control of the amplitude. Further, an adder 78 at the output of the phase accumulator 74 allows control of the phase by adding time offset to the lookup memory 72.

The phase accumulator 74 is incremented once for each row of image data and is programmed with a value of K such that F(t) equals the flicker frequency. Alternatively, the phase accumulator 74 can be clocked with an independent clock source. The lookup memory 72 can be programmed with a sinusoid or with some other waveform which more closely models the flicker. Here, input $K_f$ is the constant value to produce the desired output frequency from the DDS 70a as already discussed in connection with FIG. 7A above; input $K_p$ is the phrase control output 69a of the extractor circuit 60 of FIG. 6; and input $K_p$ is the phrase control output 69a of the extractor circuit 60 of FIG. 6.

Applying The Flicker Correction Signal

Referring again to FIG. 3, the flicker correction signal w(t) 79 is applied to the image data 52 by multiplying the image data 52 by the correction signal 79. For example, if one correction signal value is generated for each row of pixels of the image sensor array 34, each row of pixels is multiplied by its corresponding correction signal. The correction signal is then updated for the next row. This operation produces a flicker corrected image output 89. The flicker correction should not be applied to saturated pixels. Otherwise flicker will be added to the image in those regions where the pixel values are clipped.

In the illustrated embodiment, the image sensor array 34 produces a captured image in raster order. The correction signal synthesis circuit 70 generates a flicker correction signal 79 which modulates the data from the image sensor array 34. The flicker corrected image output 89 may be further processed by additional circuits 90 or steps for additional effects including, for example, color interpolation, color correction, gamma correction, sharpening, and noise removal. Alternatively, the positions of the correction signal synthesis circuit 70 and the additional circuits 90 can be interchanged.

From the foregoing, it will be apparent that the apparatus and the methods of the present invention are novel and offer advantages over the current art. Although a specific embodiment of the invention is described and illustrated above, the invention is not to be limited to the specific forms or arrangements of parts so described and illustrated. The invention is limited only by the claims.

We claim:

1. An apparatus comprising:
   an image sensor array adapted to capture a scene into electrical values, a border of the image sensor array defining a plurality of sides thereof;
   a reference detector proximal to said sensor array for detecting an illuminant intensity, the reference detector being disposed to surround at least a portion of each of two adjacent sides of the image sensor array; and
   a processor (1) receiving electrical values corresponding to the detected illuminant intensity from the reference detector, (2) computing at least a phase of the illuminant intensity using the electrical values from the reference detector and (3) controlling the generation of a flicker correction signal having a phase matching the computed phase of the illuminant intensity.

2. The apparatus recited in claim 1 wherein said apparatus is a digital camera.

3. The apparatus recited in claim 1 wherein said image sensor array comprises CMOS image sensors.

4. The apparatus recited in claim 1 wherein said reference detector is adjacent to at least two sides of said image sensor array.

5. The apparatus recited in claim 1 wherein said reference detector surrounds said image sensor array.

6. The apparatus recited in claim 1 wherein said image sensor array has a field of view and said reference detector has a field of view similar to said field of view of said image sensor array.

7. A method of detecting illuminant intensity changes, said method comprising:
   a. resetting a reference detector;
   b. reading a set of sensors of an image sensor array;
   c. reading the reference detector;
   d. repeating steps a through c for each set of sensors of said image sensor array; and
   computing an amplitude and a phase of an illuminant intensity using the readings from the reference detector; wherein the computing of the amplitude includes correcting the amplitude of the illuminant intensity for unvarying components thereof to detect changes in the illuminant intensity.

8. The method recited in claim 7 wherein the set of sensors comprises a multiple row of sensors.

9. The method recited in claim 7 wherein said reference detector is adjacent to said image sensor array.

10. A method of processing a digital image, the method comprising:
    detecting illuminant intensities during a frame period of the digital image, the illuminant intensities converted to digital values, the illuminant intensities having flicker at a flicker frequency;
    extracting flicker correction parameters from the illuminant intensities, the flicker correction parameters include amplitude and phase components of the illuminant intensity, the amplitude component of the illuminant intensity being corrected for an unvarying component of the illuminant intensity;
    synthesizing a flicker correction signal from the flicker correction parameters; and
    applying the flicker correction signal to the digital image.

11. The method recited in claim 10 wherein said step of detecting illuminant intensity values comprises:
    a. resetting a reference detector;
    b. reading a row of sensors of an image sensor array;
    c. reading the reference detector; and
    d. repeating steps a through c for each of the rows of said image sensor array.

12. The method recited in claim 10 wherein said step of extracting flicker correction parameters comprises performing sine and cosine transforms on the illuminant intensity values.

13. The method recited in claim 12 wherein the sine and cosine transforms are obtained by integrating product of the illuminant intensity values with sine and cosine waves at the flicker frequency over an interval of a number of flicker periods.

14. The method recited in claim 13 further comprising applying apodization function to the integrand to improve accuracy.

15. The method recited in claim 10 wherein said step of extracting flicker correction parameters comprises performing IQ demodulation.

16. The method recited in claim 10 wherein said step of applying flicker correction to the digital image comprises multiplying the illuminant intensity values by the flicker correction signal.

17. The method recited in claim 16 wherein said step of applying flicker correction is skipped for saturated pixels of the illuminant intensity values.

18. An apparatus comprising:
    an image sensor array adapted to capture a scene into electrical values within an image capture period, a border of the image sensor array defining a plurality of sides thereof;
    a reference detector adapted to detect an illuminant intensity within the image capture period, the reference detector being disposed to surround at least a portion of each of two adjacent sides of the image sensor array;
    a processor connected to said image sensor array and the reference detector and adapted to process the electrical values from the image sensor array and to compute at least a phase of the illuminant intensity using readings from the reference detector to generate a flicker correction signal having a phase matching the computed phase of the illuminant intensity; and
    memory connected to said processor and adapted to store the electrical values.

19. The apparatus recited in claim 18 further comprising an extractor circuit.

20. The apparatus recited in claim 19 wherein said extractor circuit comprises an IQ demodulator.

21. The apparatus recited in claim 18 further comprising a correction signal synthesis circuit.

22. The apparatus recited in claim 21 wherein said correction signal synthesis circuit comprises a direct digital synthesizer.

23. The apparatus recited in claim 1, wherein the processor further computes an amplitude of the illuminant intensity using the readings from the reference detector such that the computation of the amplitude includes correcting the amplitude of the illuminant intensity for unvarying components thereof to detect changes in the illuminant intensity.

24. A method of detecting illuminant intensity changes, said method comprising:
    resetting a reference detector;
    reading a set of sensors of an image sensor array;
    reading the reference detector;
    repeating the resetting of the reference detector and the readings of the set of sensors
    and the reference detector for each set of sensors of said image sensor array;
    computing at least a phase of an illuminant intensity using the readings from the reference detector; and
    generating a flicker correction signal having a phase that matches the computed phase of the illuminant intensity.

* * * * *